United States Patent [19]
Rubinstein et al.

[11] 4,096,392
[45] Jun. 20, 1978

[54] RACK FOR STORING SPENT NUCLEAR FUEL ELEMENTS

[75] Inventors: Herbert J. Rubinstein, Los Gatos; Philip M. Clark; James D. Gilcrest, both of San Jose, all of Calif.

[73] Assignee: Nuclear Services Corporation, Campbell, Calif.

[21] Appl. No.: 595,444

[22] Filed: Jul. 11, 1975

[51] Int. Cl.² .................................................. G21f 5/00
[52] U.S. Cl. ...................................... 250/507; 176/30; 176/87; 250/518
[58] Field of Search ............. 250/506, 507, 515, 518; 176/30, 87, 27; 211/60 R, 60 S

[56] References Cited

U.S. PATENT DOCUMENTS

| 3,046,403 | 7/1962 | Montgomery | 250/507 |
| 3,845,315 | 10/1974 | Blum | 250/507 X |
| 3,859,533 | 1/1975 | Suvanto | 250/507 |

Primary Examiner—Davis L. Willis
Attorney, Agent, or Firm—Jack M. Wiseman

[57] ABSTRACT

A rack for storing spent nuclear fuel elements in which a plurality of aligned rows of upright enclosures of generally square cross-sectional areas contain vertically disposed fuel elements. The enclosures are fixed at the lower ends thereof to a base. Pockets are formed between confronting walls of adjacent enclosures for receiving high absorption neutron absorbers, such as Boral, cadmium, borated stainless steel and the like for the closer spacing of spent fuel elements.

17 Claims, 7 Drawing Figures

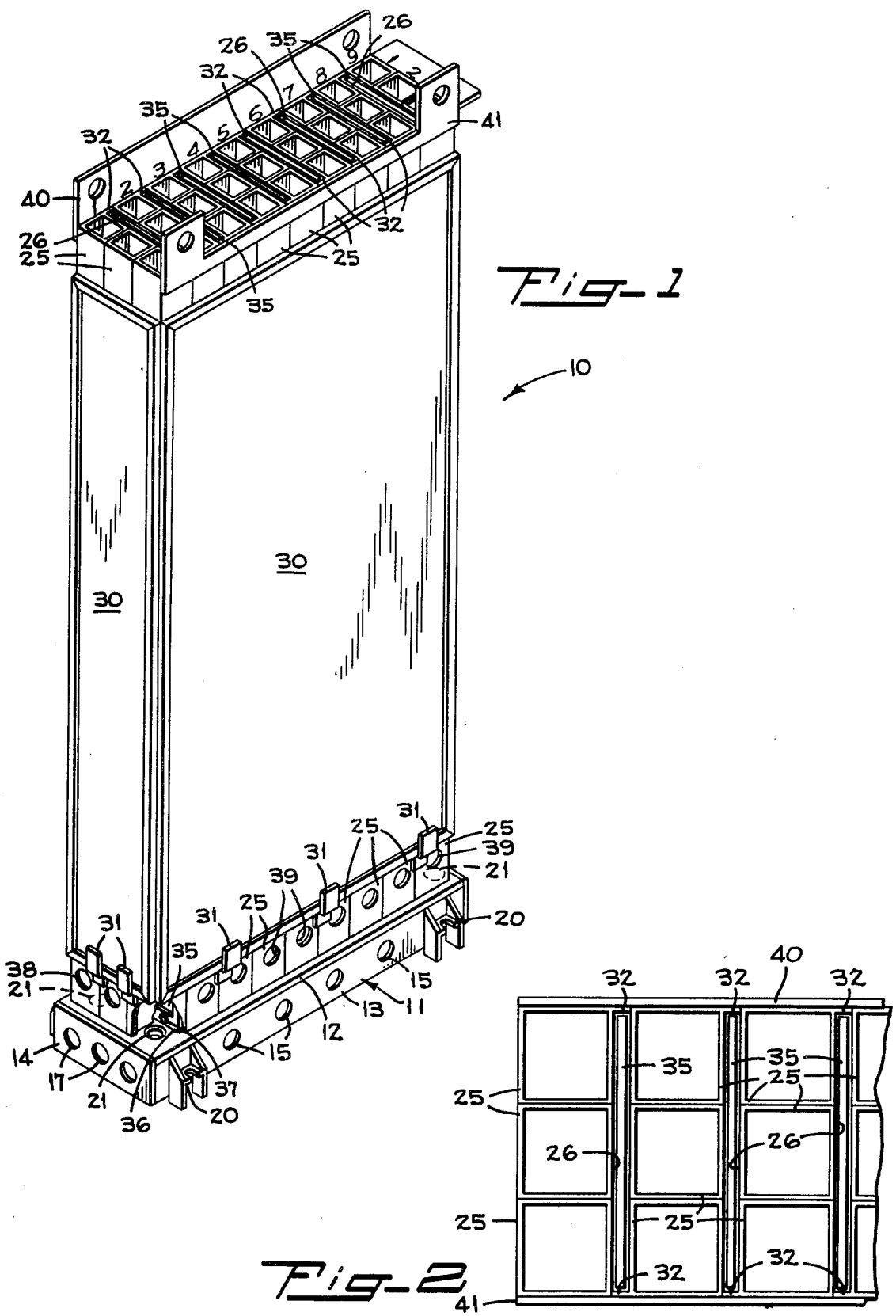

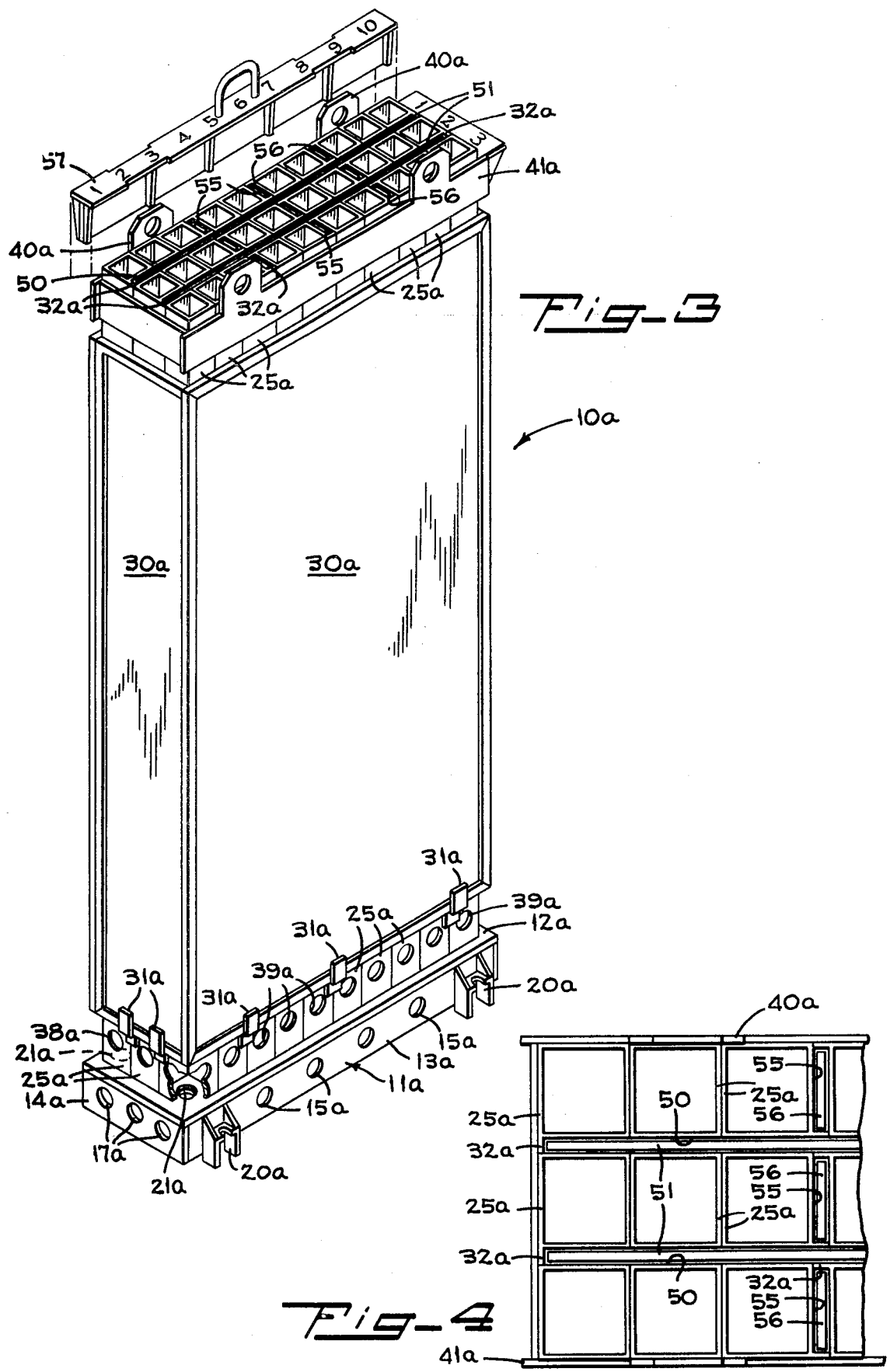

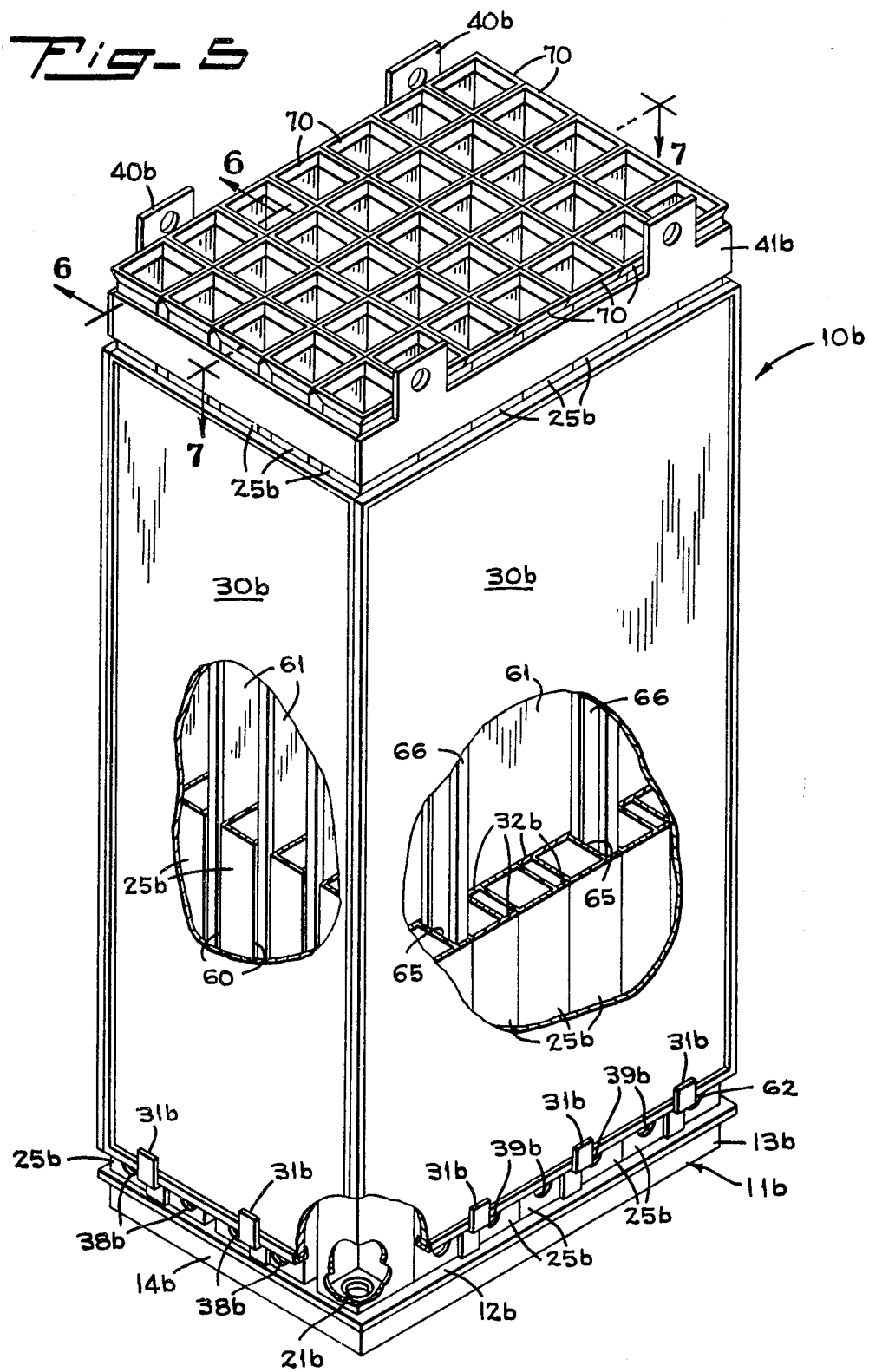

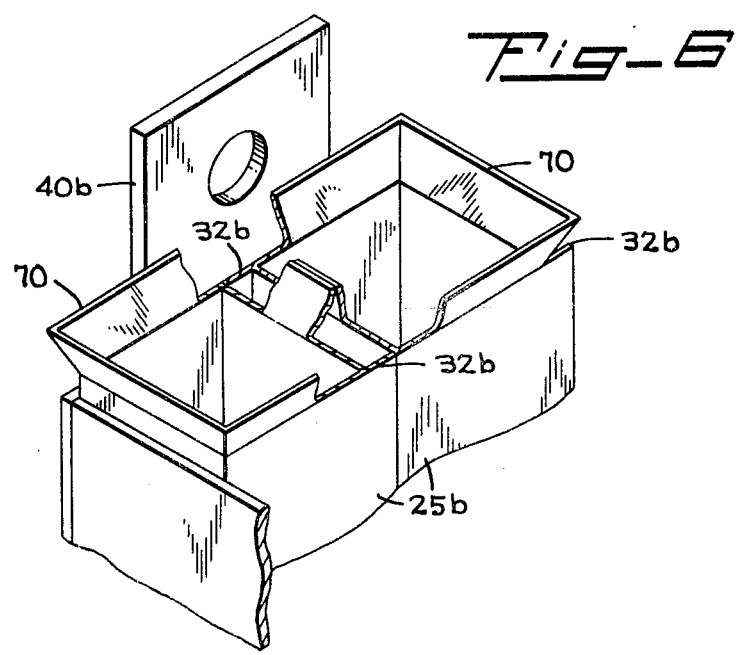
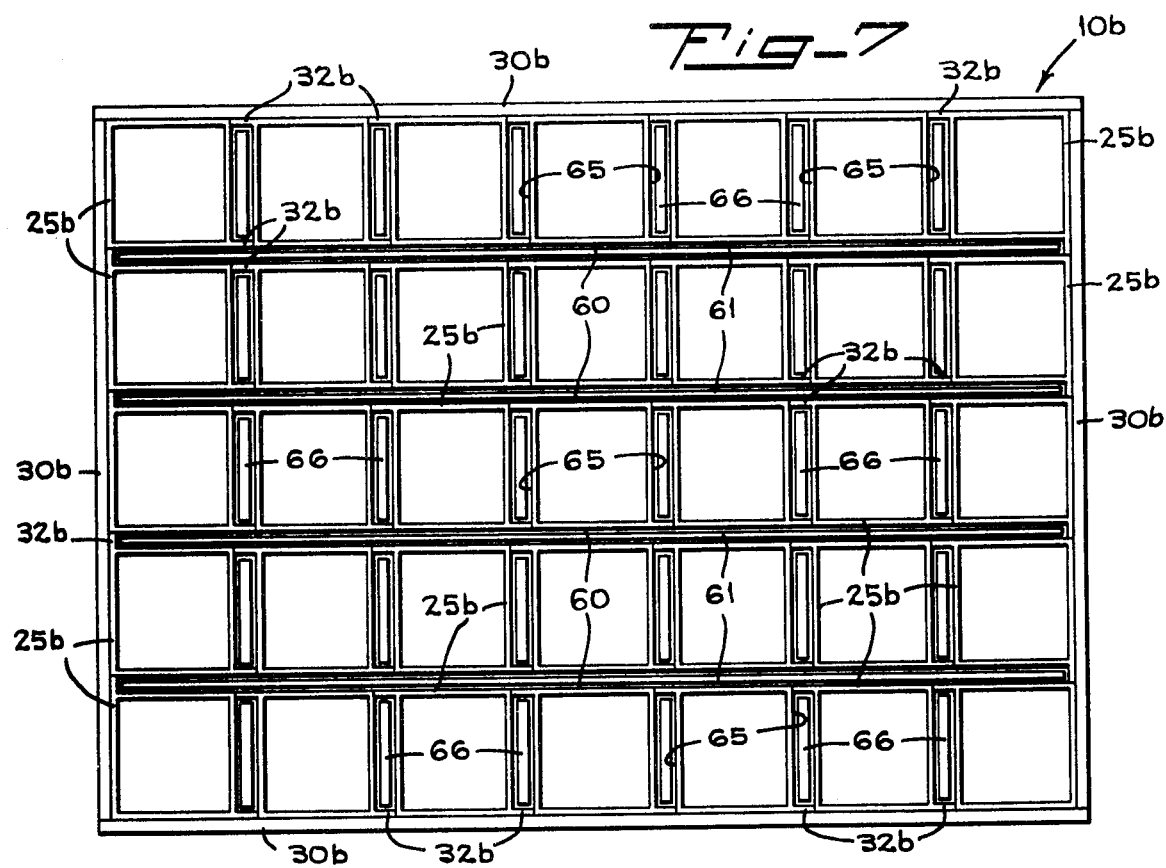

DEVICE FOR STACKING AND RETAINING IN A STACK FLAT GOODS, PARTICULARLY PLASTIC BAGS

This invention relates to a device for stacking and retaining in a stack flat goods, particularly perforated plastic bags, which comprises transfer means with retaining members in parallel relationship cooperating with two opposite edges on the bags, allowing to bring said bags from the manufacturing machine to the stacking location and means for releasing said bags from the transfer means in said location to form a bag stack.

There are known presently for obtaining bag stacks on forks used for the automatic packing of goods and particularly for the automatic packing of bread, devices in which the bags are stacked one by one on rods made fast to a conveying means and fed by pairs, due to a stepwise movement of the conveying means, to the bag stacking location. Such devices have various drawbacks and mainly that they require a very high accuracy in the positioning of the rods when the conveying means thereof stops and it is noticed on such devices a number of bag alinement deficiencies due to variations in position of the rods relative to the correct position at the stacking location, variations which add up to the variations in the position of the bags when they are released from the transfer means thereof and this in spite of the perforations provided in the bags having a diameter which is much larger than the rod diameter. Said known devices have moreover the drawback of requiring on the one hand, the removal by hand of the bag stacks from said rods to transfer same to the forks which allow the conveying thereof and on the other hand, the arrangement by hand on said forks of the means such as cardboard, resilient washers, etc., for retaining said bags on the forks.

The invention has for object to obviate said drawbacks and to provide a device with a simple structure allowing to stack the bags directly on the forks allowing the conveying thereof up to the automatic packing machines, to locate very accurately all of the forks used one by one to form the stacks and to locate automatically on said forks those means for retaining the bags stacked thereon. Said device has first the substantial advantage of reducing very substantially the stacking deficiencies due to the forks always lying in the same position when the bags are released from the transfer means thereof and it is only necessary to consider the position variations of the bags as they are released from said means, said variations being more easily compensated for due to the differential between the perforation diameter and the fork leg diameter than said added variations. The device according to the invention has also the advantage of substantially reducing the handling operations to be performed as it does allow to avoid a manual arrangement of the bag stacks on the forks as required in the known devices as well as the manual arrangement of those means retaining the bags on the forks.

For this purpose according to the invention, the device comprise fixed means to feed forks one by one to the stacking location along a path at right angle to the transfer means movement direction between the parallel members and adjacent that edge provided with said perforations of those bags retained by said members, said forks of U-shape being free relative to one another, with legs directed at right angle to the transfer means movement direction and the leg free ends being directed towards the means allowing to release the bags from the transfer means in such a way that the fork legs enter the bag perforations, and means for moving the fork brought to the stacking location and on which will be stacked the bags to form a stack, along a direction in parallel relationship with the legs thereof to let said fork lie in two positions, the one position in which the fork is stationary to allow stacking the bags during said stacking operation and the second position in which the fork is free and can leave by gravity the device with the bags stacked thereon.

In an advantageous embodiment of the invention, the device comprises means so arranged as to locate on the fork legs when said fork lies in said first position and after stacking the last bag bag in a stack, at least one element cooperating resiliently with the fork legs for retaining the bags on said fork.

In a particularly advantageous embodiment of the invention, the device comprises means for arranging on the fork legs, either when said fork is brought to the first position thereof or when the fork lies in said first position and before stacking the bags, at least one element cooperating resiliently with the fork legs for retaining the bags on the fork legs and preventing said bags folding back by sliding off the fork legs on the fork bottom when said fork is released.

Other details and features of the invention will stand out from the description given below by way of non limitative example and with reference to the accompanying drawings, in which;

FIG. 1 is a diagrammatic elevation view with parts broken away of the device according to the invention.

FIG. 2 is a view along line II—II in FIG. 1.

FIG. 3 is a view similar to FIG. 2 showing another embodiment of the device as shown in FIGS. 1 and 2.

In the various figures, the same reference numerals pertain to similar elements.

The device according to the invention and shown in the accompanying drawings comprises transfer means 1 which are well known notably from Belgian Pat. No. 563,370 with retaining members 2 in parallel relationship which cooperate with two opposite edges 3 and 4 of bags 5 allowing to feed said bags from the manufacturing machine therefor (not shown) to stacking location 6 and means 7 also known, allowing to release said bags from the transfer means 1 in said location 6 to form a bag stack on a U-shaped fork 8 the legs 9 of which enter perforations 10 provided in said bags. Said device comprises fixed means 11 to bring said forks 8 one by one to the stacking location 6 along a path at right angle to the movement direction of the transfer means 1 between the parallel members 2 and adjacent that bag edge 4 provided with the perforations 10. Said forks 8 are free relative to one another and the legs 9 thereof are directed at right angle to said movement direction with the free ends 12 facing the means 7, means 13 being provided to move the fork 8 brought to the stacking location 6 along a direction in parallel relationship with the legs 9 thereof to let it lie in two positions, a first position (shown in solid lines in FIG. 1) in which the fork 8 is secured to allow the stacking of the bags and during the complete duration of said stacking operation, and a second position (shown in dotted lines in FIG. 1) in which the fork 8 and the bag stack it does bear are free and can be released by gravity from said device. The means 11 for bringing the forks 8 one by one to location 6 are comprised of a magazine 14 of tubular Depending from the base plate 12 are four longitudinally extending, transversely spaced support members 13 and four transversely extending, longitudinally spaced support members 14. The members 13 and 14 are vertically disposed and are made of cast or fabricated metal, such as aluminum or steel. The members 13 and 14 are suitably fixed to the base plate 12, such as by welding. Openings 15 are formed in the members 13 as passageways for water. Likewise, openings 17 are formed in the members 14 as passageways for water.

Suitable brackets 20 are secured to the outer members 13 by welding or the like and receive anchor bolts, not shown, for securing the base 11 to the bottom of the spent fuel storage pool. Openings 21 are formed in the base plate 12 for receiving the lower tie plate of the nuclear fuel element. The base 11, preferably, is made with the same bolt pattern as the bolt pattern of the racks heretofore employed so as to be compatible and interchangeable with the previously used spent fuel storage racks.

According to the present invention, fixed to the base plate 12 by suitable means, such as welding, is a plurality of upstanding nuclear fuel element enclosures 25. In the preferred embodiment, each of the enclosures 25 is formed with a generally square cross-sectional area to dispose therein a spent nuclear fuel element of the type employed in nuclear power plants. The enclosures 25 are preferably made of aluminum or stainless steel. Fuel spaces are formed from extrusions or pre-formed boxes with protrusions 32 to provide pockets 26 when welded together.

In the exemplary embodiment, each enclosure 25 has an inside cross-sectional dimension of 6 inches. The outside cross-sectional dimension can suitably be 6½ inches. Additionally, each enclosure 25, in the exemplary embodiment, is approximately 13 feet or 14 feet long. In a typical embodiment, there are nine or 10 rows of enclosures 25 and three columns of enclosures 25. The enclosures 25 in each row are contiguous and are preferably welded together along the lengths thereof for rigidifying the rack 10 and for improved aseismic design. Successive rows of enclosures are, however, spaced apart to form pockets 26 between confronting walls of the enclosures 25. The rack 10, in the exemplary embodiment, provides storage areas for 27 or 30 nuclear fuel elements in a storage pool for a boiling water reactor nuclear power plant.

Surrounding the sides and ends of the rack 10 are vertically disposed panels 30, such as panels of Boral sheets. Other high absorption neutron absorbers, such as cadmium sheets, borated stainless steel sheets, and the like, may also be employed. Boral is sold by Brooks & Perkins Corporation and comprises boron carbide particles dispersed in an aluminum metal. The Boral sheets serve as a neutron absorber. The sheets of Boral are employed to maintain the effective multiplication factor ($K_{eff}$) for the full array below the required limit or the point of criticality. The panels 30 of Boral are supported by a weld across the top of the edge thereof. Clips 31 inhibit horizontal movement of the panels 30 and allow vertical displacement. The load on the rack is not applied to the panels 30 of Boral. Thus, thermal expansion is accommodated without any load applied to the panels 30 from rack flexure. In the exemplary embodiment, the thickness of each of the panels 30 of Boral is ¼ inch.

As shown in FIGS. 1 and 2, the pockets 26 are completely enclosed at the bottom thereof by the base plate 12, at the sides thereof by confronting walls of spaced apart enclosures 25, and at the ends thereof by the vertically disposed extensions or spacer members 32. The extensions 32, preferably, extend along the entire length of the enclosures 25 associated therewith and are of projected dimension from the associated enclosure equal to the distance between confronting walls of spaced apart enclosures 25.

Disposed within each pocket 26 is a suitable neutron absorber. In the preferred embodiment, the neutron absorber is a sheet 35 of Boral. Other high absorption neutron absorbers, such as cadmium, borated stainless steel, or poisoned plastic sheets, may also be employed. In the exemplary embodiment, the thickness of each of the sheets 35 of Boral is ⅛ inch. The sheets 35 of Boral extend along the length of the enclosures 25 in an area corresponding to the active length of the nuclear fuel elements. At the lower sections of the sheets 35 of Boral are located metallic tabs 36 (FIG. 1) with openings 37 formed therein as passageways for water. Openings 38 and 39 of the enclosures 25 are also passageways for water. It is the pockets 26 that provide the enclosures for the sheets 35 of Boral for maintaining the correct positions thereof with respect to the spent reactor fuel elements for effective neutron absorption. Some of the sheets 35 of Boral are removable from the pockets 26, while under water, for in-service inspection, while other sheets of Boral are welded to the enclosures 25 to prevent inadvertent removal from the pockets 26.

Sheets of Boral, cadmium or borated stainless steel are preferred in the pockets 26 over water as a neutron absorber, because Boral, cadmium and borated stainless steel have a greater neutron absorption capacity. This allows a closer geometric spacing of spent fuel elements without exceeding the $K_{eff}$ limit. Thus, the spent nuclear fuel elements can be located closer to one another without exceeding the critical limit for the effective multiplication factor ($K_{eff}$) for the fuel array. More specifically, the spent nuclear fuel elements can be spaced closer together and the effective multiplication factor ($K_{eff}$) for the fuel array will remain below the required limit. In this manner, more spent nuclear fuel elements can occupy a given space in the storage pool of a nuclear power plant.

Welded to the outside walls of the exterior columns of enclosures 25 are suitable lift plates 40 and 41. Conventional grapples or hoisting devices grip the lift plates 40 and 41 for raising and lowering the rack 10. The lift plate 40 has numbers thereon for position identification of fuel elements.

Illustrated in FIGS. 3 and 4 is a rack 10a for storing spent nuclear fuel elements in a storage pool for a nuclear power plant, which is a modification of the rack 10 shown in FIGS. 1 and 2. Parts of the rack 10a which are similar in construction and function to the parts of the rack 10 are shown with the same reference numeral accompanied by a suffix "a."

In the rack 10a, the enclosures 25a form in the exemplary embodiment three columns, which are spaced apart. The spaces between columns of enclosures 25a form pockets 50. The bottoms of the pockets 50 are formed by the base plate 12a, the sides of the pockets 50 are formed by confronting walls of the spaced apart enclosures 25a, and the ends of the pockets 50 are formed by the extensions 32a. Disposed within the pockets 50 are sheets 51 of Boral, cadmium or borated stainless steel. Selected rows of enclosures 25a are spaced apart to form pockets 55. The bottom of the pockets 55 is the base plate 12a, the sides of the pockets 55 are the confronting walls of spaced apart enclosures 25a and the ends of the pockets 55 are the extensions 32a. Disposed within the pockets 55 are sheets 56 of Boral, cadmium or borated stainless steel. A spacer 57 occupies space between racks and transmits lateral forces from rack to rack. Illustrated in FIGS. 5–7 is a rack 10b for storing spent nuclear fuel elements in a storage pool for a pressurized water reactor nuclear power plant, which is a further modification of the rack 10 shown in FIGS. 1 and 2. Parts of the rack 10b which are similar in construction and function to the parts of the rack 10 are shown with the same reference numeral accompanied by a suffix "b."

In the rack 10b, the enclosure 25b form, in the exemplary embodiment, five columns which are spaced apart. The space between columns of enclosures 25b form pockets 60. The bottoms of the pockets 60 are formed by the base plate 12b, the sides of the pockets 60 are formed by the confronting walls of the spaced apart enclosures 25b, and the ends of the pockets 60 are formed by the extensions 32b. Disposed within the pockets 60 are sheets 61 of Boral, cadmium or borated stainless steel. In the typical embodiment, there are seven rows of enclosures 25b. The rows of enclosures 25b are spaced apart to form pockets 65. The bottom of the pockets 65 is the base plate 12b, the sides of the pockets 65 are the confronting walls of spaced apart enclosures 25b, and the ends of the pockets 65 are the extensions 32b. Disposed within the pockets 65 are sheets 66 of Boral, cadmium or borated stainless steel.

At the top of the enclosures 25b are fixed suitable outwardly directed skirts 70 for guiding the deposit of the spent nuclear fuel elements into the respective enclosures 25b.

We claim:

1. A rack for spent nuclear fuel elements comprising:
   (a) a base;
   (b) a plurality of upstanding enclosures supported by said base for containing respectively a spent nuclear fuel element, adjacent enclosures being spaced apart to form vertically disposed pockets;
   (c) neutron absorbers disposed in said pockets for controlling nuclear reactivity; and
   (d) upstanding neutron absorber panels disposed exteriorly of said enclosures and along the outer limits of the rack for controlling nuclear reactivity from spent nuclear fuel elements stored in said enclosures.

2. A rack as claimed in claim 1 wherein said neutron absorbers being of the group consisting of boron carbide particles dispersed in an aluminum metal, cadmium, borated stainless steel and plastic sheets.

3. A rack as claimed in claim 2 wherein said panels comprising a sheet of neutron absorber, said neutron absorber for said panels being of the group consisting of boron carbide particles dispersed in an aluminum metal, cadmium, and borated stainless steel.

4. A rack as claimed in claim 3 wherein said base provides the bottoms for said pockets, said spaced apart enclosures being formed with confronting walls to provide the sides for said pockets, and said enclosures being formed with upstanding extensions extending between the space of spaced apart enclosures for providing the ends of said pockets.

5. A rack as claimed in claim 4 wherein each of said enclosures is formed with a generally square cross-sectional area.

6. A rack as claimed in claim 1 wherein said base provides the bottoms for said pockets, said spaced apart enclosures being formed with confronting walls to provide the sides for said pockets, and said enclosures being formed with upstanding extensions extending between the space of spaced apart enclosures for providing the ends of said pockets.

7. A rack as claimed in claim 6 wherein said neutron absorbers being of the group consisting of boron carbide particles dispersed in an aluminum metal, cadmium, borated stainless steel and plastic sheets.

8. A rack as claimed in claim 6 wherein each of said enclosures is formed with a generally square cross-sectional area.

9. A rack as claimed in claim 1 wherein certain of said neutron absorbers being removably disposed in their associated pockets for in-service inspection.

10. A rack for spent nuclear fuel elements comprising:
    (a) a base;
    (b) a plurality of upstanding enclosures supported by said base for containing respectively a nuclear fuel element, said enclosures being arranged in rows and in columns, adjacent enclosures being spaced apart to form vertically disposed pockets;
    (c) sheets of neutron absorbers disposed in said pockets for controlling nuclear reactivity from spent nuclear fuel elements stored in said enclosures; and
    (d) upstanding neutron absorber panels disposed exteriorly of said enclosures and along the outer limits of the rack for controlling nuclear reactivity from spent nuclear fuel elements stored in said enclosures.

11. A rack as claimed in claim 10 wherein each of said enclosures has a generally square cross-sectional area.

12. A rack as claimed in claim 11 wherein adjacent enclosures in a row of enclosures are fixed to one another for rigidifying said rack and successive rows of enclosures are spaced apart to form said pockets, said base providing the bottoms for said pockets, said spaced apart successive rows of enclosures being formed with confronting walls to provide the sides for said pockets, the enclosures in the outer columns of said enclosures being formed with upstanding extensions extending between the space of spaced apart successive rows of enclosures for providing the ends of said pockets.

13. A rack as claimed in claim 11 wherein adjacent enclosure in a column of enclosures are fixed to one another for rigidifying said rack and successive columns of enclosures are spaced apart to form said pockets, said base providing the bottoms for said pockets, said spaced apart successive columns of enclosures being formed with confronting walls to provide the sides for said pockets, the enclosures in the outer rows of said enclosures being formed with upstanding extensions extending between the space of spaced apart successive columns of enclosures for providing the ends of said pockets.

14. A rack as claimed in claim 13 wherein successive rows of enclosures are spaced apart to form second pockets, said base providing the bottoms for said second pockets, said spaced apart successive rows of enclosures being formed with confronting walls to provide the sides for said second pockets, the enclosures in the outer columns of said enclosures being formed with upstanding extensions extending between the space of spaced apart successive rows of enclosures for providing the ends of said second pockets, said rack further comprising sheets of neutron absorbers disposed in each of said second pockets for controlling nuclear reactivity from nuclear fuel elements in said enclosures.

15. A rack as claimed in claim 14 wherein certain of said successive rows of enclosures are spaced apart to form said second pockets.

16. A rack as claimed in claim 10 wherein said sheets of neutron absorbers being of the group consisting of boron carbide particles dispersed in an aluminum metal, cadmium, borated stainless steel the plastic sheets, and said panels of neutron absorbers comprising a sheet of neutron absorber of the group consisting of boron carbide particles dispersed in an aluminum metal, cadmium, and borated stainless steel.

17. A rack as claimed in claim 10 wherein said sheets of neutron absorbers being of the group consisting of boron carbide particles dispersed in an aluminum metal, cadmium, borated stainless steel and plastic sheets.

* * * * *

UNITED STATES PATENT AND TRADEMARK OFFICE
CERTIFICATE OF CORRECTION

PATENT NO. : 4,096,392

DATED : June 20, 1978

INVENTOR(S) : Herbert J. Rubinstein et al.

Page 1 of 2

It is certified that error appears in the above-identified patent and that said Letters Patent are hereby corrected as shown below:

Columns 1 and 2 should be cancelled and the attached sheet substituted therefor.

Signed and Sealed this

Twelfth Day of June 1979.

[SEAL]

Attest:

RUTH C. MASON
*Attesting Officer*

DONALD W. BANNER
*Commissioner of Patents and Trademarks*

RACK FOR STORING SPENT NUCLEAR FUEL ELEMENTS

BACKGROUND OF THE INVENTION

The present invention relates in general to the storage of nuclear fuel elements and more particularly to a rack for the storing of spent nuclear fuel elements in a pool for a nuclear power plant.

Heretofore, racks for spent nuclear fuel elements were formed from standard structual members, such as angle bars, I-beams, T-shaped members and channel members. Such racks were manufactured by General Electric Company, Combustion Engineering Company, Inc., PAR Systems, Speedway Machine & Tool Co., Inc., and others. A fuel storage rack sold by PX Engineering Company, Inc. is illustrated in Nuclear News, Mid-April 1974, which appears to employ upright enclosures of a generally square cross-sectional area. The fuel rack sold by Speedway Machine & Tool Co. appears to be formed from upright posts braced by horizontal members spaced apart vertically. The General Electric spent fuel storage rack appears to employ upright I-beams, T-shaped columns and upright channel members.

The delay in the availability of nuclear fuel reprocessing plants have presented the problem to nuclear power plants of being able to transport the spent fuel elements to a reprocessing plant. When a reactor is refueled, the spent fuel elements are stored in the spent fuel storage pool of a nuclear power plant. Spent fuel storage pools for the usual nuclear power plant were designed to store one full reactor core plus one or two discharges of spent nuclear fuel elements. A fuel discharge may be from .20 to .33 of a core loading. It is desirable to always maintain enough space in the spent fuel storage pool to unload the full reactor core. Generally, this would leave space for only one or two discharges of the nuclear fuel elements. A nuclear power plant should have sufficient space for the spent nuclear fuel elements to enable the nuclear power plant to keep operating and refueling until it is possible to transport spent nuclear fuel elements to a reprocessing plant.

Heretofore, spent fuel storage racks have relied on water and physical separation as the primary means of neutron moderation and absorption between nuclear fuel elements. The nuclear fuel elements have been spaced by the rack storing the same so that the effective multiplication factor ($K_{eff}$) for the fuel array would remain below the required limit. As a consequence thereof, a large portion of the rack and the spent fuel storage area was occupied by water.

It has been known that a highly effective neutron absorber, such as Boral, can be used between fuel assemblies to reduce fuel element spacing. Boral has a much greater neutron absorption cross-section than water and allows a closer geometric spacing of fuel elements without exceeding the $K_{eff}$ limit. Brooks & Perkins Corporation sells Boral, which comprises boron carbide particles dispersed in aluminum metal. Cadmium and borated stainless steel have also been used as neutron absorbers.

SUMMARY OF THE INVENTION

A rack for storing nuclear fuel elements comprising upright enclosures for storing fuel elements which form pockets therebetween for containing a neutron absorber.

By virtue of the present invention, a greater number of spent fuel elements can occupy the same floor space and still maintain the effective multiplication factor ($K_{eff}$) below the required limit. Accordingly, nuclear power plants will have sufficient space to store a greater number of spent reactor fuel elements until a reprocessing plant can accommodate the transportation of the spent reactor fuel elements. As a result thereof, the shutdowns of nuclear power plants will be reduced.

The decrease in spacing requirements between spent reactor fuel elements achieved by the present invention is applicable to both the boiling water reactor and the pressurized water reactor nuclear power plants. By decreasing the spacing requirements between spent reactor fuel elements, the capacity of a given storage pool for storing spent fuel elements is increased. Therefore, the pool can accommodate a greater number of spent nuclear fuel elements. This results in an increase of storage time capability. The additional space capacity for the spent nuclear fuel elements is desirable to enable a nuclear power plant to keep operating and refueling until it is possible to transport spent fuel elements to a reprocessing plant.

DESCRIPTION OF THE DRAWINGS

FIG. 1 is a perspective view of a rack for storing spent nuclear fuel elements in a boiling water reactor nuclear power plant embodying the present invention, and particularly illustrating the formation of pockets between rows of upright enclosures, in which pockets are disposed neutron absorbers.

FIG. 2 is a fragmentary enlarged plan view of the rack shown in FIG. 1.

FIG. 3 is a perspective view of a rack for storing spent nuclear fuel elements in a boiling water reactor nuclear power plant embodying the present invention, which is a modification of the rack shown in FIGS. 1 and 2, and particularly showing the formation of pockets between selected rows and columns of upright enclosures, in which pockets are disposed neutron absorbers.

FIG. 4 is a fragmentary enlarged plan view of the rack shown in FIG. 3.

FIG. 5 is a perspective view of a rack for storing spent nuclear fuel elements in a pressurized water nuclear power plant embodying the present invention, which is a further modification of the rack shown in FIGS. 1 and 2, and particularly illustrating the formation of pockets between all rows and columns of upright enclosures, in which pockets are disposed neutron absorbers.

FIG. 6 is an enlarged fragmentary perspective view taken along line 6—6 of FIG. 5.

FIG. 7 is a horizontal sectional view of the rack shown in FIG. 5 taken along line 7—7 of FIG. 5.

DETAILED DESCRIPTION OF THE PREFERRED EMBODIMENTS

Illustrated in FIGS. 1 and 2 is a rack 10 for storing spent nuclear fuel elements embodying the present invention. In use, the rack 10 is disposed in a conventional manner in a conventional spent fuel pool for a nuclear power plant. The pool contains water in which the rack 10 is submerged. The rack 10 comprises a suitable base 11. In the exemplary embodiment, the base 11 includes a horizontal base plate 12 of a rectangular configuration, which is made of a cast or fabricated metal, such as aluminum or steel.